United States Patent
Thompson et al.

(10) Patent No.: US 6,290,155 B1
(45) Date of Patent: Sep. 18, 2001

(54) WOOD CHIPPER WITH NOISE AND VIBRATION ABATEMENT FEATURES

(75) Inventors: Kent Lee Thompson, Otley; James Lee O'Halloran; John Tibbe Bremeir Bouwers, both of Pella, all of IA (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

(21) Appl. No.: 09/401,202

(22) Filed: Sep. 22, 1999

(51) Int. Cl.[7] .................................................. B02C 25/00
(52) U.S. Cl. ........................................... 241/92; 241/101.2
(58) Field of Search ............................... 241/101.76, 92, 241/101.2, 280, 281, 282

(56) References Cited

U.S. PATENT DOCUMENTS

| | | |
|---|---|---|
| 1,367,306 | 2/1921 | Brun . |
| 2,472,341 | 6/1949 | Roach et al. . |
| 2,611,279 | 9/1952 | Bergsten et al. . |
| 2,643,092 | 6/1953 | Paulette . |
| 2,654,263 | 10/1953 | Pringnitz et al. . |
| 3,727,847 | 4/1973 | Nelson . |
| 3,730,441 | 5/1973 | Waldrop et al. . |
| 3,762,233 | 10/1973 | Colloton . |
| 3,819,121 | 6/1974 | Rogers . |
| 3,884,421 | 5/1975 | Fullalove et al. . |
| 3,889,887 | 6/1975 | Wagstaff et al. . |
| 4,020,995 | 5/1977 | Pürrer . |
| 4,067,369 | * 1/1978 | Harmon . |
| 4,074,869 | 2/1978 | Johnson . |
| 4,796,819 | 1/1989 | Waterman . |
| 4,827,995 | * 5/1989 | Wilson . |
| 4,834,302 | 5/1989 | Baker . |
| 4,961,539 | * 10/1990 | Deem ............................... 241/101.76 |
| 5,005,620 | * 4/1991 | Morey ..................................... 241/92 |
| 5,097,970 | * 3/1992 | Lamoureux ....................... 241/285.1 |
| 5,137,219 | 8/1992 | Morey . |
| 5,322,307 | 6/1994 | Tilton et al. . |
| 5,390,862 | * 2/1995 | Eglin .............................. 241/101.76 |
| 5,692,548 | * 12/1997 | Bouwers et al. ....................... 241/92 |

FOREIGN PATENT DOCUMENTS

| | | |
|---|---|---|
| 2803736 | 8/1979 | (DE) . |
| 0069109 | 1/1983 | (EP) . |

OTHER PUBLICATIONS

Brochure, "Brush Chipper BC1800A", *Vermeer*, 2 pgs., (©1998).
Exhibit 1 of Vermeer BC1800A chipper that is prior art with respect to this application.
Exhibits 2A and 2B show a Vermeer BC935 chipper that is prior art with respect to this application.
Exhibits 3A and 3B show a Vermeer BC625 chipper that is prior art with respect to this application.

* cited by examiner

*Primary Examiner*—Mark Rosenbaum
(74) *Attorney, Agent, or Firm*—Merchant & Gould P.C.

(57) ABSTRACT

The present disclosure relates to a wood chipper including a support frame, a housing mounted on the support frame, a cutter member for chipping wood within the housing, and a discharge chute for discharging wood chips from the housing. The wood chipper also includes a first resilient isolator for dampening vibration between the housing and the support frame.

19 Claims, 10 Drawing Sheets

WOOD CHIPPER WITH NOISE AND VIBRATION ABATEMENT FEATURES

FIELD OF THE INVENTION

The present relates generally to wood chippers. More particularly, the present invention relates a wood chipper having noise and vibration abatement features.

BACKGROUND OF THE INVENTION

U.S. Pat. No. 5,692,548 to Bouwers et al. discloses one type of prior art wood chipper. The chipper includes a rotating cutting drum adapted to cut wood into small chips that are propelled through a discharge chute. Feed rollers are used to feed the wood desired to be chipped from an inlet into a cutting path of the rotatable cutting drum.

In recent years, wood chippers have become larger and more powerful. Consequently, such wood chippers have also become louder and more subject to excessive vibration. Noise pollution, especially in urban areas, is a growing concern. Excessive vibration generates noise and can cause premature fatigue failure in chipping devices. Therefore, what is needed is a wood chipper having improved noise and vibration abatement characteristics.

SUMMARY OF THE INVENTION

One aspect of the present invention relates to a wood chipper including a support frame, an engine mounted on the support frame, and at least one resilient isolator for dampening vibration between the engine and the support frame. The chipper also includes a drive sheave, a chipping mechanism mounted on the support frame, and a belt for transferring torque between the drive sheave and the chipping mechanism. The drive sheave is moveable to tighten and loosen the belt. A drive member is provided for transferring torque between the engine and the drive sheave. The drive member includes a pivotal portion that allows the drive sheave to be laterally moved relative to the engine when the belt is tightened and loosened.

Another aspect of the present invention relates to a wood chipper including a support frame, a housing mounted on the support frame, a cutter member for chipping wood within the housing, and a discharge chute for discharging wood chips from the housing. The wood chipper also includes a first resilient isolator for dampening vibration between the housing and the support frame.

A further aspect of the present invention relates to a wood chipper including a support frame, a housing mounted on the support frame, a cutter member for chipping wood within the housing, and a discharge chute for discharging wood chips from the housing. The wood chipper also includes a feed mechanism for feeding wood toward the cutter member, an inlet for allowing wood to be fed toward the feed mechanism, and a noise abating curtain that at least partially covers the inlet opening. The curtain includes a noise absorbing layer positioned between two wear resistant layers.

Still another aspect of the present invention relates to a wood chipper including a support frame, a housing mounted on the support frame, a cutter member for chipping wood within the housing, and a discharge chute for discharging wood chips from the housing. The wood chipper also includes a feed mechanism for feeding wood toward the cutter member, an inlet chute having an inlet for allowing wood to be fed toward the feed mechanism, and a detent member positioned on the inlet chute. The detent member defines a rear detent, an intermediate detent, and a front detent. The wood chipper further includes front and rear switches are positioned near the detent member, a control bar positioned near the inlet chute for controlling a feed direction of the feed mechanism, and a detent arm that moves in concert with the control bar. The detent arm is moveable between: i) a rearward position in which a portion of the detent arm is received within the rear detent; ii) a neutral position in which the portion of the detent arm is received within the intermediate detent; and iii) a forward position in which the portion of the detent arm is received within the forward detent. When the detent arm is moved from the neutral position toward the forward position, the detent arm engages the front switch thereby causing the feed mechanism to operate in an out-feed mode. When the detent arm is moved from the neutral position toward the rearward position, the detent arm engages the rear switch thereby causing the feed mechanism to operate in an in-feed mode.

The various aspects of the present invention provide numerous advantages over the prior art. For example, certain aspects of the present invention provide a power takeoff arrangement that is less expensive has lower operating costs, and requires less maintenance than many systems incorporating conventional friction-type clutches. Another aspect of the present invention relates to a power takeoff arrangement that decreases the likelihood of drive train damage and simplifies the belt changing process. Still another aspect of the present invention relates to a power takeoff arrangement that discourages side loading on the engine thereby allowing the engine to be isolated with a relatively simple vibration dampening scheme. Certain other aspects of the present invention relate to wood chipper configurations having improved noise and vibration abatement characteristics. A variety of additional advantages of the various aspects of the invention will be set forth in part in the description that follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of the specification, illustrate several aspects of the invention and together with the description, serve to explain the principles of the invention. A brief description of the drawings is as follows.

DETAILED DESCRIPTION

Reference will now be made in detail to exemplary aspects of the present invention that are illustrated in the accompanying drawings. Wherever possible, the same reference numbers will be used throughout the drawings to refer to the same or like parts.

Figure 1:
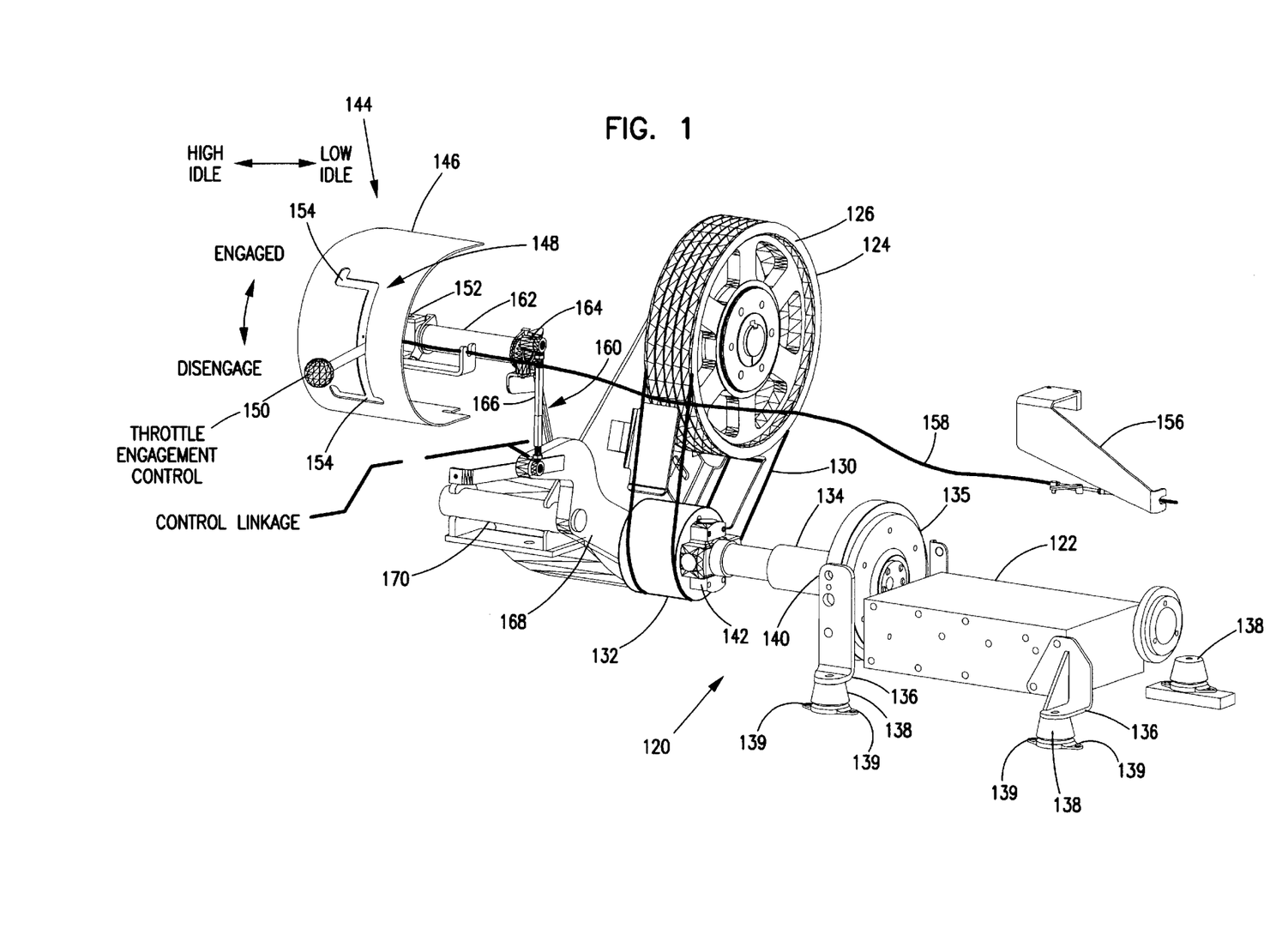
FIG. 1 illustrates a power takeoff configuration constructed in accordance with the principles of the present invention.

FIG. 1 illustrates a power takeoff 120 constructed in accordance with the principles of the present invention. The power takeoff 120 is configured for transferring torque from an engine 122 to a driven element 124. As shown in FIG. 1, the driven element 124 includes a sheave 126 that is preferably coupled to a structure desired to be rotated (not shown) such as a cutting drum or a disc-type cutter. The driven element 124 is preferably rotated by a belt 130 or similar structure that is entrained about the driven element 124 and a drive sheave 132. Torque is transferred from the engine 122 to the drive sheave 132 by a drive member 134. The power takeoff 120 is engaged by moving the drive sheave 132 away from the driven element 124 such that the belt 130 tightens and torque is transferred from the drive sheave 132 to the driven element 124. The power takeoff 120 is disengaged by moving the drive sheave 132 toward the driven element 124 such that the belt loosens and torque is no longer transferred from the drive sheave 132 to the driven element 124.

The engine 122 is preferably a standard internal combustion engine. As shown in FIG. 1, the engine 122 includes a flywheel 135, and a plurality of mounting flanges 136. In the illustrated embodiment, the flanges 136 are be located adjacent four corners of the engine 122. The engine 122 also includes an isolation scheme for dampening vibration generated by the engine 122. For example, referring to FIG. 1, elastomeric mounting members 138 are provided beneath the mounting flanges 136. While any number of different isolator configurations could be used, in the embodiment shown, each of the elastomeric mounting members 138 has a truncated cone shape with a top end fastened to one of the flanges 136 (e.g., by a fastener such as a bolt, screw, etc.) and a bottom end secured to mounting plates 139. The mounting plates 139 define openings for allowing the plates to be fastened (e.g., screwed, bolted, etc.) to a structure on which the engine 122 is mounted (e.g., a chipper frame). Preferably, the mounting members 138 are made of a resilient material such as rubber. A preferred resiliency for the mounting members 138 is in the range of 2100–3000 pounds per inch of deflection.

The drive member 134 functions to transfer torque from the engine 122 to the drive sheave 132. The drive member 134 preferably includes a pivotal portion or portions that allow the drive sheave 132 to be laterally moved relative to the engine 122 when the belt 130 is tightened or loosened. T he drive sheave 132 is moved "laterally" relative to the engine 122 when the sheave 132 is moved either toward or away from the driven element 124.

The phrase "pivot portion or portions" is intended to include any type of flexible or pivotal structure that is capable of transferring torque while concurrently allowing the drive sheave 132 to be moved laterally relative to the engine 122. As shown in FIG. 1, the pivot portions of the drive member 134 include a first universal joint 140 connected directly to the flywheel 135, and a second universal joint 142 connected to the drive sheave 132.

The power takeoff 120 also includes a control arrangement 144 for moving the drive sheave 132 between the engaged position in which torque is transferred between the drive sheave 132 and the driven element 124, and the disengaged position in which torque is not transferred between the drive sheave 132 and the driven element 122. The control arrangement 144 also includes structure for adjusting the engine speed between a high idle condition and a low idle condition.

Referring to FIG. 1, the control arrangement 144 includes a control panel 146 defining a slot 148, and a control lever 150 that extends through the slot 148. The slot 148 includes an intermediate portion 152 and transverse end portions 154 that project transversely outward from the intermediate portion 152 in a direction that extends away from the engine 122. The drive sheave 132 is moved from the disengaged position toward the engaged position by pivoting the control lever 150 upward along the intermediate portion 152 of the slot 148. The drive sheave 132 is moved from the engaged position toward the disengaged position by pivoting the control lever 150 downward along the intermediate portion 152 of the slot 148. The engine speed is adjusted from the low idle condition to the high idle condition by pivoting the control lever 150 along one of the transverse portions 154 of the slot 148 in a direction away from the intermediate portion 152 of the slot 148. Conversely, the engine speed is adjusted from the high idle condition to the low idle condition by pivoting the control lever 150 along one of the transverse portions 154 of the slot 148 in a direction toward the intermediate portion 152 of the slot 148. The configuration of the slot 148 prevents the power takeoff 120 from being engaged or disengaged when the engine 122 is in a high idle condition. Such a configuration assists in reducing the likelihood of an operator causing damage to the machine.

The control lever 150 is connected to a throttle 156 (for clarity shown separate from the engine) of the engine 122 by a throttle cable 158. When the control lever 150 is pivoted away from the intermediate portion 152 of the slot 148 along either of the transverse portions 154 of the slot 148, the control lever 150 pulls on the throttle cable 158 causing the throttle 156 to open. By contrast, when the control lever 150 is pivoted toward the intermediate portion 152 of the slot 148 along either of the transverse portions 154 of the slot 148, the throttle cable 158 becomes relaxed thereby allowing a spring structure (not shown) to close the throttle 156.

The control arrangement 144 also includes a control linkage 160 that connects the control lever 150 to the drive sheave 132. The control linkage 160 includes a shaft 162, a first intermediate link 164, a second intermediate link 166, and a main pivot link 168. The shaft 162 is preferably mounted to rotate about its longitudinal axis. The control lever 150 is connected to the shaft 162 such that the shaft 162 is caused to rotate about its longitudinal axis when the control lever 150 is pivoted along the intermediate portion 152 of the slot 148. The first intermediate link 164 projects radially outward from the shaft 162. One end of the intermediate link 164 is fixedly connected to the shaft 162 and an opposite end is pivotally connected to the second intermediate link 166. The second intermediate link 166 has one end pivotally connected to the first intermediate link 164 and an opposite end pivotally connected to the main pivot link 168. The main pivot link 168 has one end pivotally connected to the second intermediate link 166 and an opposite end connected to a shaft on which the drive sheave 132 is rotatably mounted. The main pivot link 168 is pivotally connected to a pivot mount 170 at an intermediate positioned along the length of the main pivot link 168. The pivot mount 170 is preferably connected to a structure such as a frame such that side loading from the drive sheave 132 can be transferred through the main pivot link 168 to the frame.

When the control lever 150 is moved upward along the slot 148, the control linkage 160 causes the drive sheave 132 to move away from the driven element 124 such that the belt 130 is tightened. By contrast, when the control lever 150 is moved downward along the slot 148, the control linkage 160 causes the drive sheave 132 to move toward the driven element 124 such that the belt 130 is loosened.

An important aspect of the invention is that the pivotal portions of the drive member 134 inhibit (i.e., reduce or substantially eliminate) side or lateral loading from being transferred through the drive member 134 to the engine 122. Instead, side loading is transferred away from the drive sheave 132 through the main pivot link 168. By preventing side loads from being applied to the engine 122, a relatively simple mounting configuration can be used to resiliently isolate the engine 122.

The above described power takeoff configuration provides numerous advantages. For example, the illustrated engage/disengage configuration does not require a clutch thereby minimizing the cost of the system. Further, the illustrated system has lower operating costs, and requires less maintenance than many systems with conventional friction-type clutches.

Figure 2:
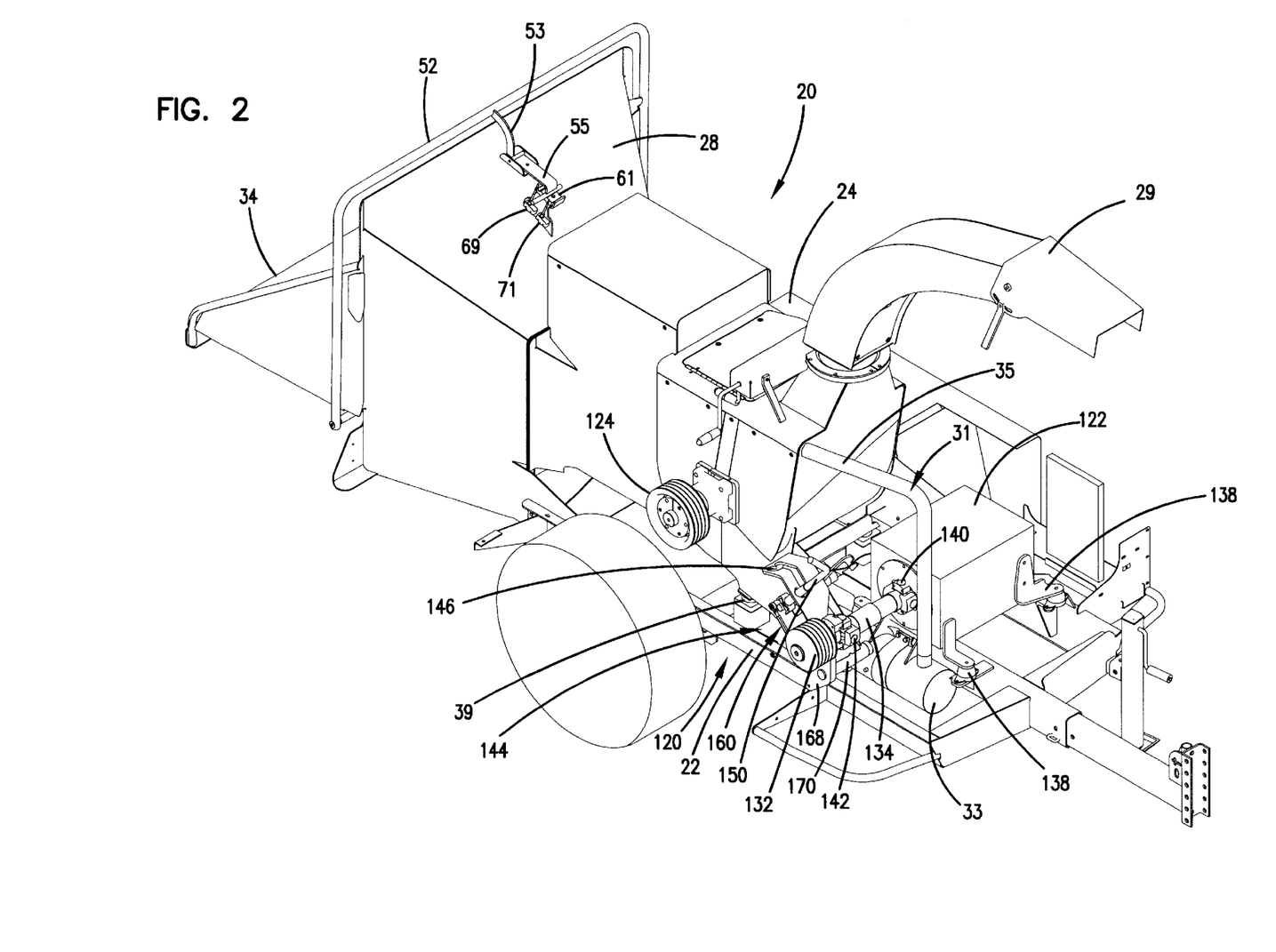
FIG. 2 is a perspective view of a wood chipper in accordance with the principles of the present invention that incorporates the power takeoff of FIG. 1.
Figure 3:
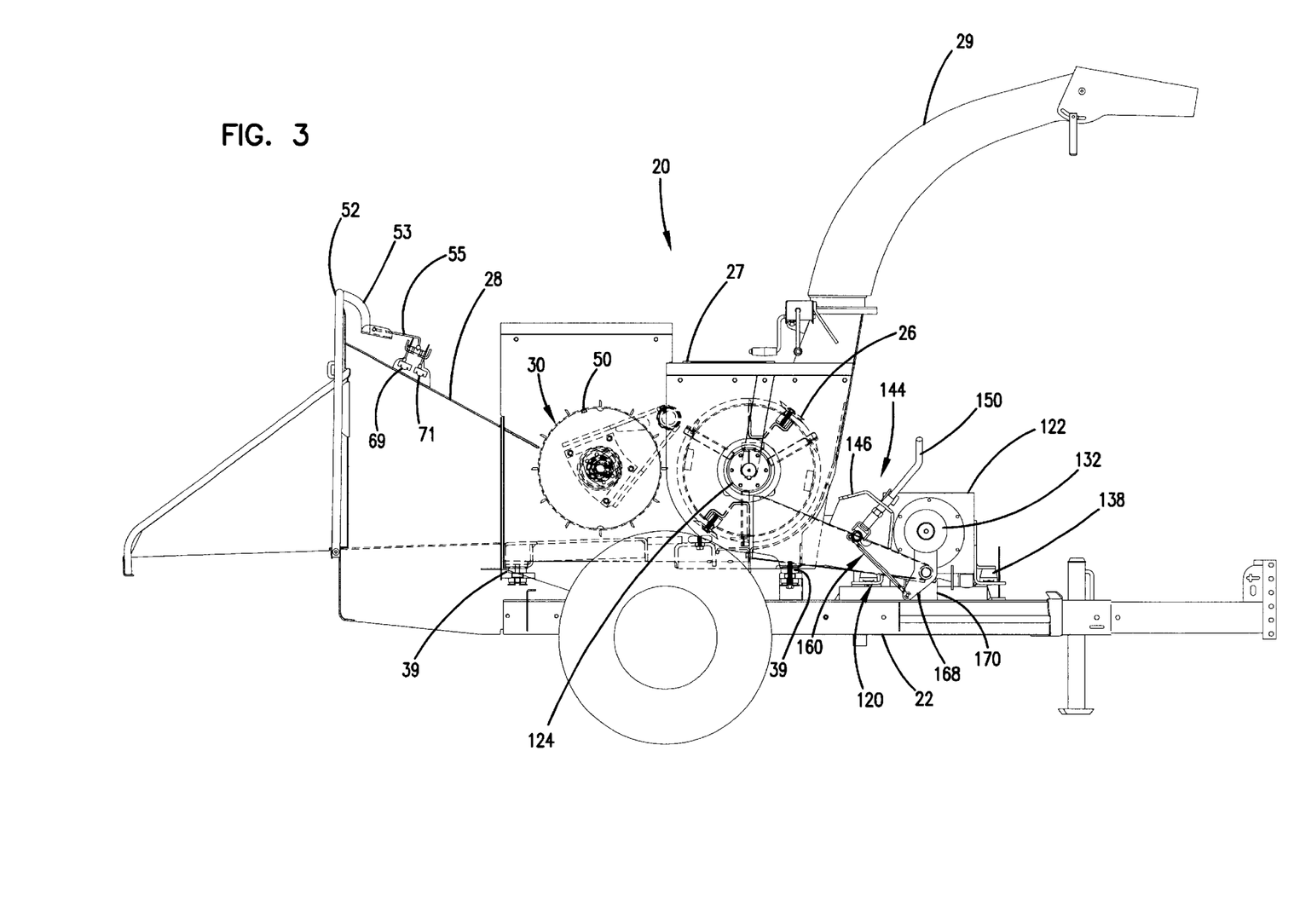
FIG. 3 is a side view of the wood chipper of FIG. 2.

FIGS. 2 and 3 illustrate a wood chipper 20 constructed in accordance with the principles of the present invention. The wood chipper 20 includes a frame 22 (e.g., a trailer structure), a cutter/feed housing 24 supported on the frame 22, and a cutter mechanism 26 (shown in FIG. 3) positioned within the housing 24. A feed mechanism 30 (shown in FIG. 3) is also positioned within the housing and functions to feed wood (e.g., logs, branches, bushes, clippings, etc.) into the cutter mechanism 26. An in-feed chute 28 is provided for allowing an operator to feed wood into the feed mechanism 30. A feed table 34 extends outward from the feed chute 28. A discharge chute 29 is provided for discharging chips generated by the cutter mechanism 26 from the housing 24.

In FIG. 3, the cutter mechanism 26 is shown as a chipping/cutting drum. However, it will be appreciated that any type of cutting mechanism (e.g., a disk cutter) could also be used. Also, the feed mechanism 30 shown in FIG. 3 includes a single horizontal roller 50. However, similar to the cutter mechanism 26, any type of feed mechanism could be used. For example, multiple feed rollers, vertical feed rollers, belts, or any other type of conveying mechanism could also be used.

Figure 4A:
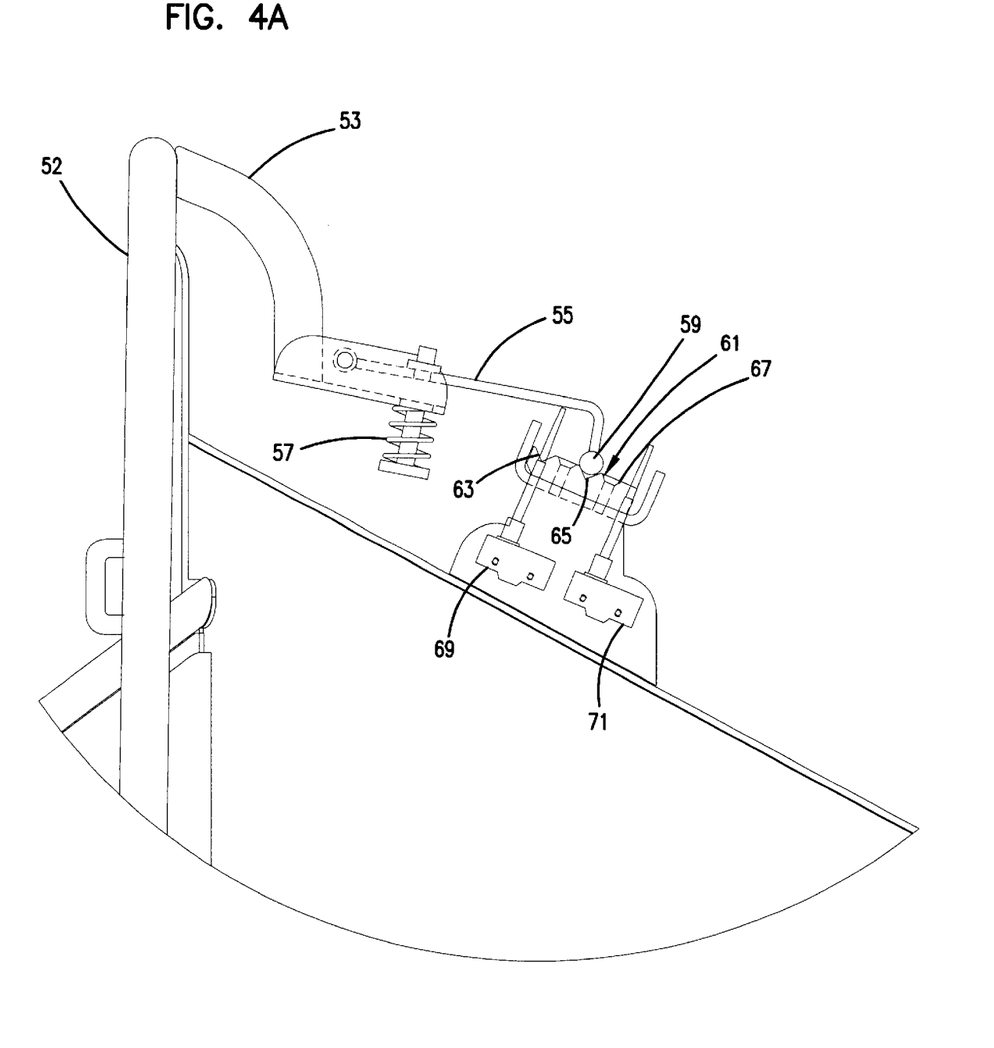
FIGS. 4A and 4B provide enlarged views of the in-feed control linkage used by the wood chipper of FIGS. 2 and 3.
Figure 4B:
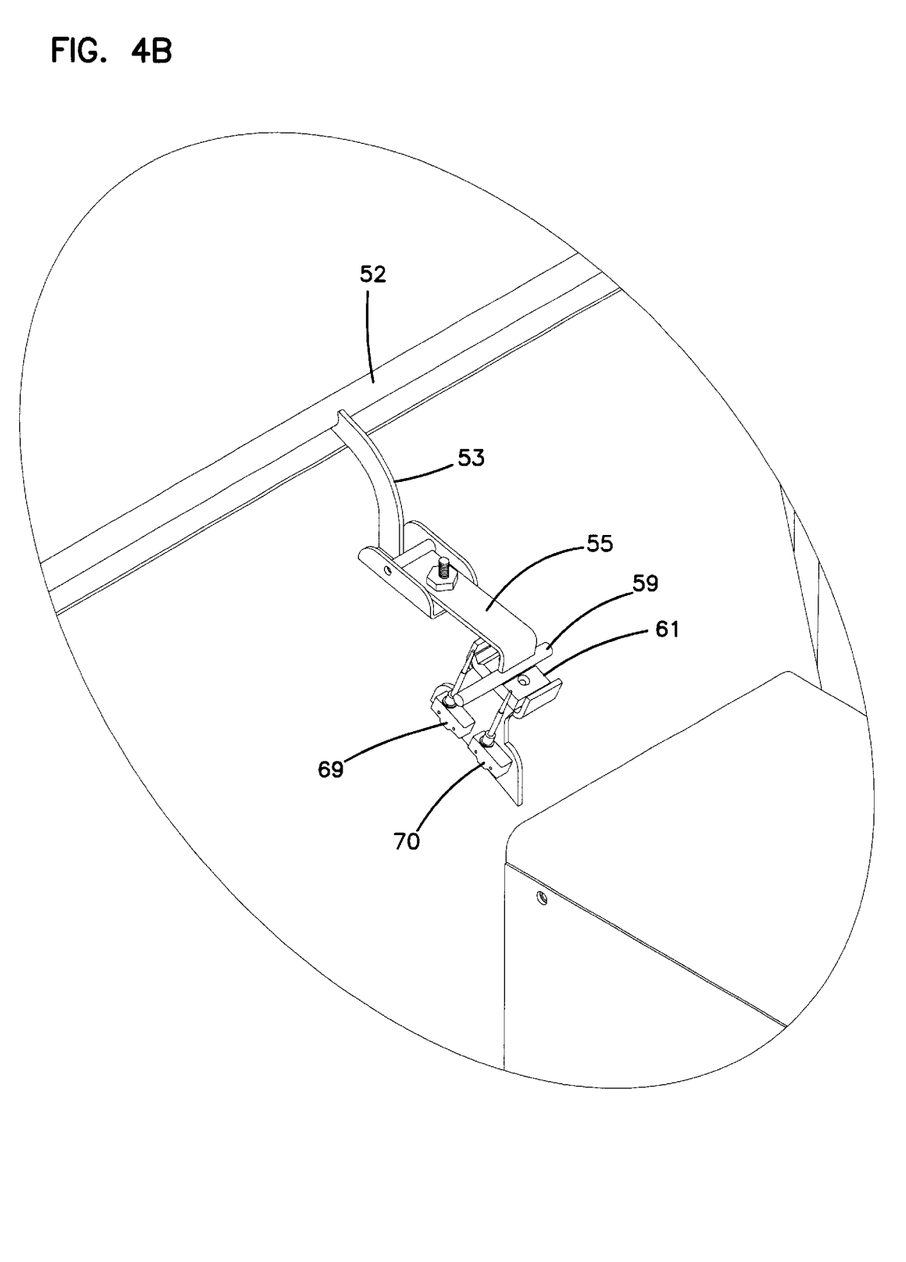

The feed mechanism 30 is controlled by a control bar 52 located adjacent to the feed table 34. As best shown in FIGS. 4A and 4B, the control bar 52 includes a fixed link 53 that extends toward the housing 24. A detent lever 55 is pivotally connected to the fixed link 53. The detent lever 55 is biased downward by a spring 57 such that an end 59 of the lever 55 is biased against a detent block 61. The detent block 61 defines a rear detent 63, an intermediate detent 65 and a front detent 67. A rear electronic switch 69 is positioned near the rear detent 63 and a front electronic switch 71 is positioned near the front detent 67. As will be described below, the switches 69 and 71 interface with a hydraulic drive system 73 (shown in FIGS. 5A–5C) to control the feed direction of the feed mechanism 30. While the drive system 73 is preferably hydraulic, it will be appreciated that other types of systems such as pneumatic systems, electric motor systems, combustion engine systems, or other mechanical systems could also be used.

Figure 5A:
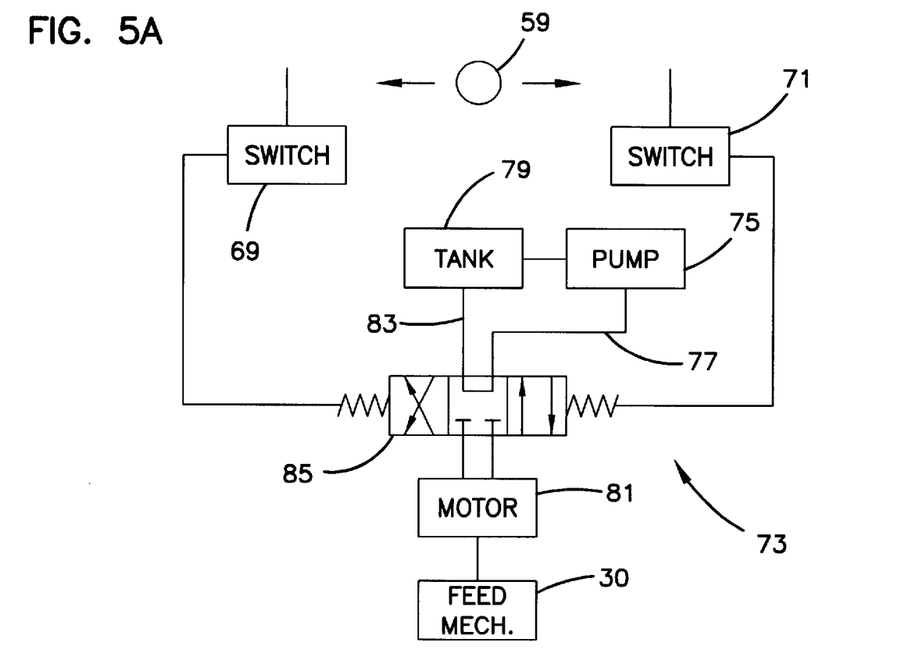
FIGS. 5A–5C illustrate a hydraulic circuit for controlling the feed roller of the wood chipper of FIGS. 2 and 3, the hydraulic circuit interfaces with the control linkage of FIGS. 4A and 4B.
Figure 5B:
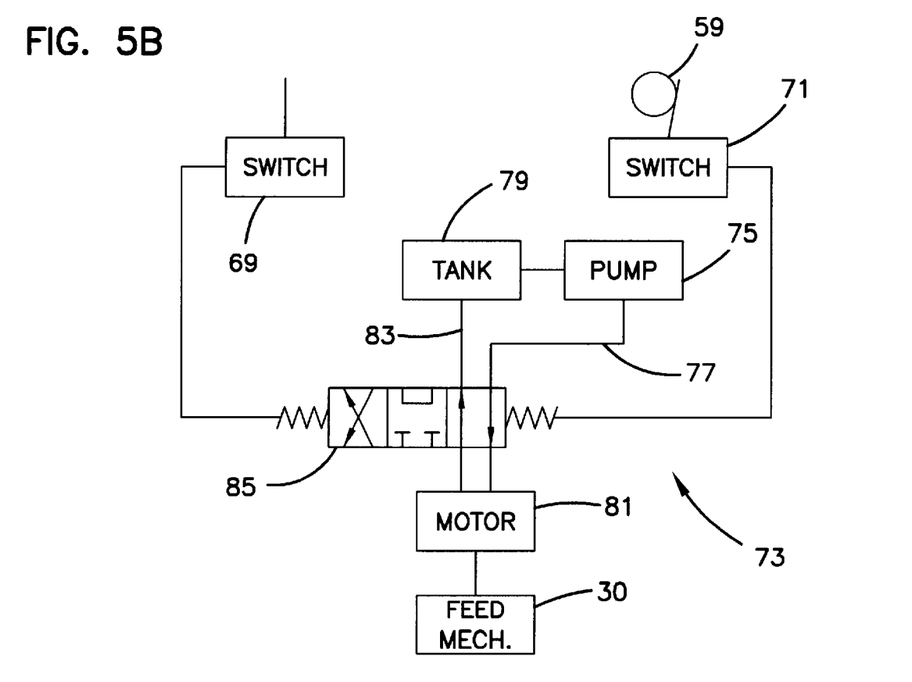
Figure 5C:
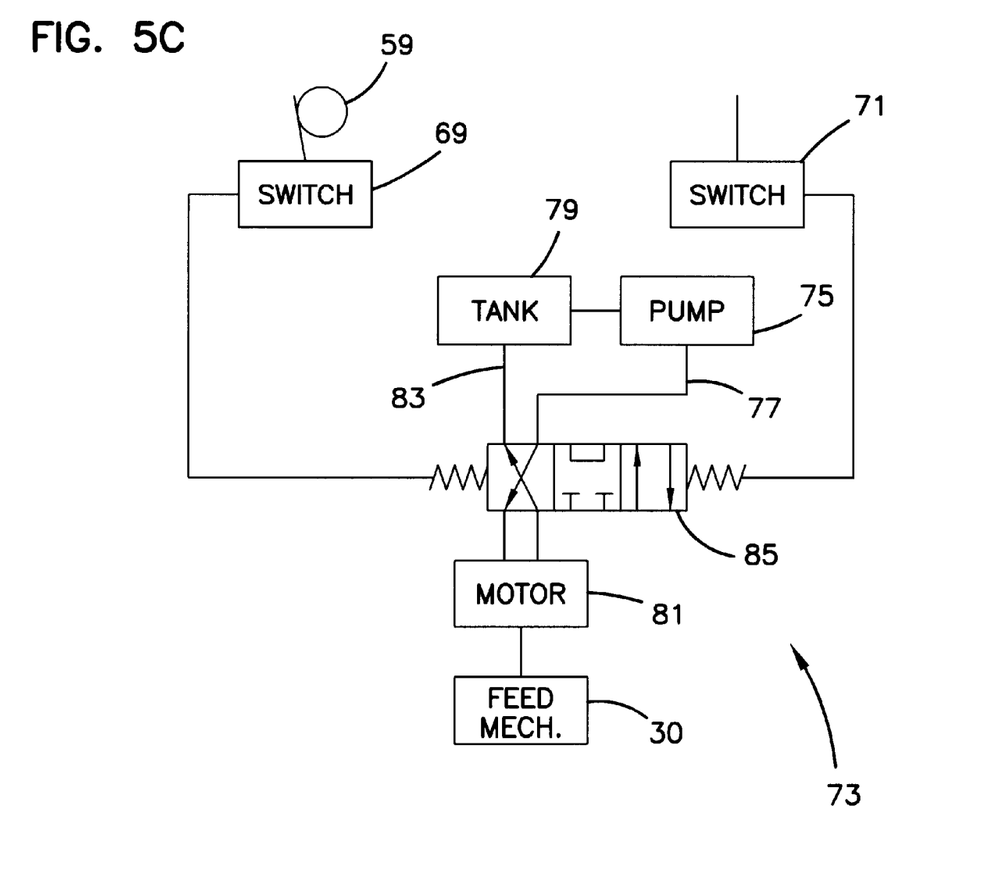

Referring to FIGS. 5A–5C, the hydraulic drive system 73 includes a hydraulic pump 75 that pumps hydraulic fluid through an inlet line 77 from a tank 79 to a motor 81. The motor 81 drives the feed mechanism 30 (i.e., the drum 50) of the chipper 20. Hydraulic fluid from the motor 81 is returned to the tank 79 though a return line 83. A three-position solenoid valve 85 controls flow through the inlet line 77 and the return line 83. The solenoid valve 85 is electrically connected to and interfaces with the switches 69 and 71. The valve 85 is moveable between a neutral position (shown in FIG. 5A) in which hydraulic fluid flow to the motor 81 is stopped, an out-feed position (shown in FIG. 5B) in which the feed mechanism 30 moves material away from the cutter mechanism 26, and an in-feed position (shown in FIG. 5C) in which the feed mechanism 30 feeds material toward the chipping mechanism 26.

When the end 59 of the detent lever 55 is received in the intermediate detent 65, neither of the switches 69 and 71 are engaged and the valve 85 is oriented in the neutral position of FIG. 5A. When the bar 52 is pushed forward, the end 59 moves from the intermediate detent 65 to the front detent 67. As the end 59 is moved toward the front detent 67, the detent lever 55 engages the front switch 71 causing the solenoid to move to the out-feed position of FIG. 5B such that the feed mechanism 30 operates in an out-feed mode (i.e., wood is fed away from the cutting mechanism 26). When the bar 52 is pulled rearward, the end 59 of the detent lever 55 moves from the intermediate detent 65 to the rear detent 63. As the end 59 is moved toward the rear detent 63, the end 59 engages the rear switch 69 causing the solenoid to move to the in-feed position of FIG. 5C such that the feed mechanism 30 operates in an in-feed mode (i.e., wood is fed toward the cutting mechanism 26).

Referring again to FIGS. 2 and 3, the housing 24 includes an isolation scheme for dampening vibration generated by cutter mechanism 26 and the feed mechanism 30. For example, elastomeric mounting members/isolators 39 are positioned between the housing 24 and the frame 22. The elastomeric mounting members 39 are preferably arranged in a general tripod configuration with one of the isolators 39 positioned at a longitudinal center line of the chipper adjacent the back end of the housing 24 (i.e., the end adjacent to the in-feed chute 28), and two of the isolators 39 positioned on opposite sides of the longitudinal center line adjacent the front end of the housing 24. Preferably, the mounting members 39 are made of a resilient material such as rubber. A non-limiting strictly exemplary resiliency of the mounting members 39 is about 450 pounds at 0.05 inches of deflection and 725 pounds at 0.085 inches of deflection. By dampening vibration generated at the housings 24, noise generated by the feed mechanism 30 and the chipping member 26 is reduced.

Figure 6:
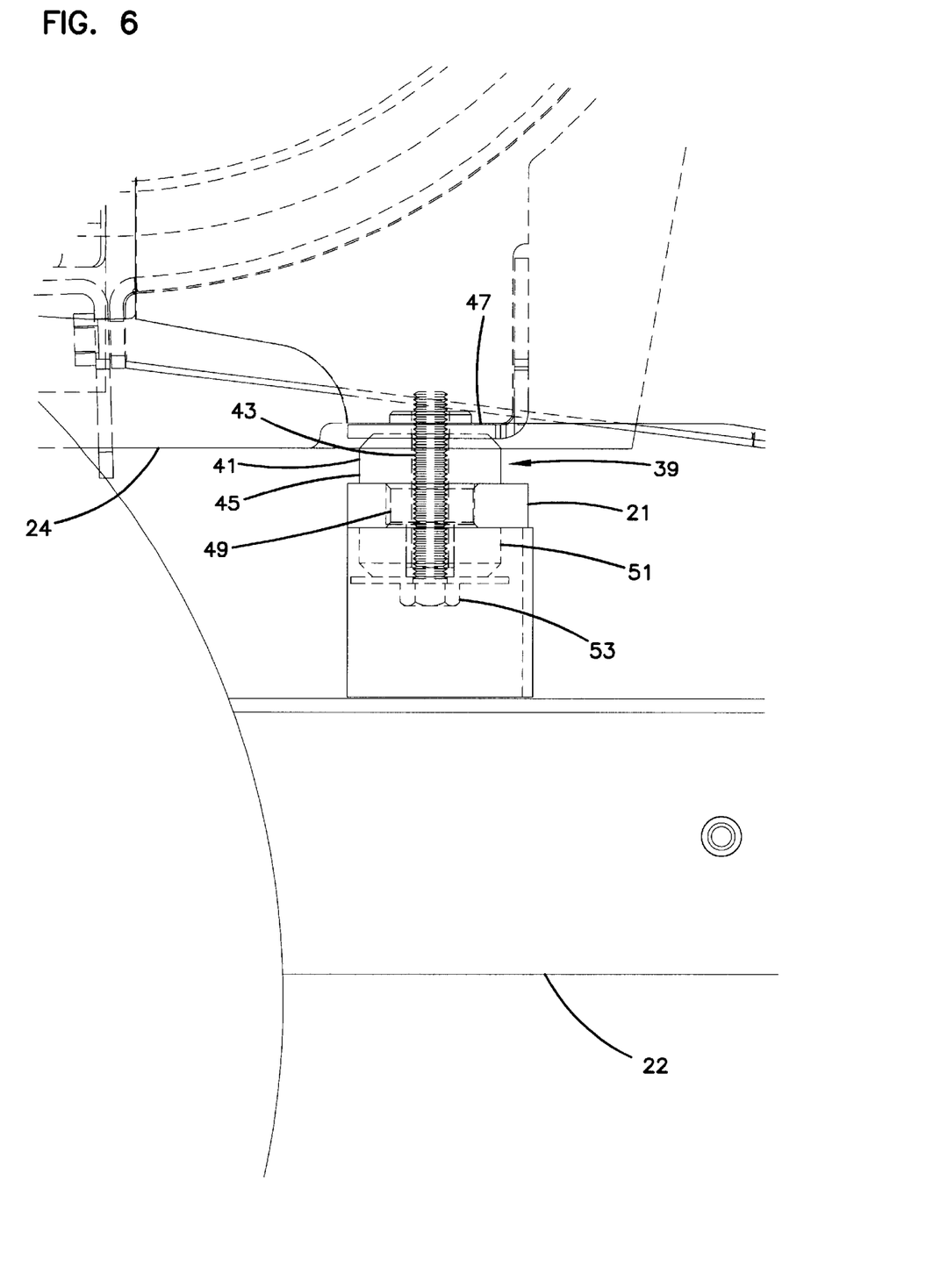
FIG. 6 is an enlarged view of one of the isolators used to abate vibration generated at the cutter/feed housing of the wood chipper of FIGS. 2 and 3.

While any number of isolator configurations can be used, FIG. 6 depicts one of the elastomeric mounting members 39 that includes a main elastomeric isolator 41 defining a bolt opening 43 extending longitudinally therethrough. The main isolator 41 includes a head portion 45 positioned between a mounting bracket 21 of the frame 22 and a bottom plate 47 of the housing 24. The main isolator 41 also includes a stem portion 49 that extends downward through a hole defined by the bracket 21 of the frame 22. A secondary elastomeric isolator 51 is mounted beneath the bracket 21 of the frame. A fastener 53 (e.g., a bolt) extends through the bolt opening 43 to secure the housing 24 to the bracket 21 and to clamp the elastomeric mounting member 39 against the housing 24 and the bracket 21.

Referring again to FIGS. 2 and 3, the wood chipper 20 includes a power takeoff 120' that is the virtually the same as the power takeoff 120 of FIG. 1 except the control arrangement 144 has been moved to the opposite side of the drive sheave 132 to facilitate belt changes. As shown in FIGS. 2 and 3, the engine 122 is secured to the frame 22 with the elastomeric mounting members 138 mounted between the engine 122 and the frame 22 to dampen vibration generated by the engine 122 and to reduce noise production. The control arrangement 144 (e.g., the control panel 146, the control lever 150 and the linkage 160) is shown mounted above the frame 22 at a location between the drive sheave 132 and the engine 122. The pivot mount 170 is fixedly connected to the frame 22 such that side loading from the drive sheave 132 is transferred through the main pivot link 168 to the frame 22. The driven element 124 is mounted on a shaft coupled to a cutting drum of the cutter mechanism 26. For clarity, the belt 130 between the drive sheave 132 and the driven element 124 has been omitted from FIGS. 2 and 3.

To further abate noise, the engine exhaust is preferably vented through the discharge chute 29 of the chipper 20. For example, a conduit 31 (shown in FIG. 2 but omitted from FIG. 3 for clarity) extends from the engine exhaust outlet to the cutter housing 24. The conduit 31 includes a muffler 33 and an exhaust pipe 35. Exhaust from the engine 122 travels through the conduit 31 to the housing 24. From the housing 24, the exhaust gas flows upward and exits the chipper 20 through the discharge chute 29.

Figure 7:
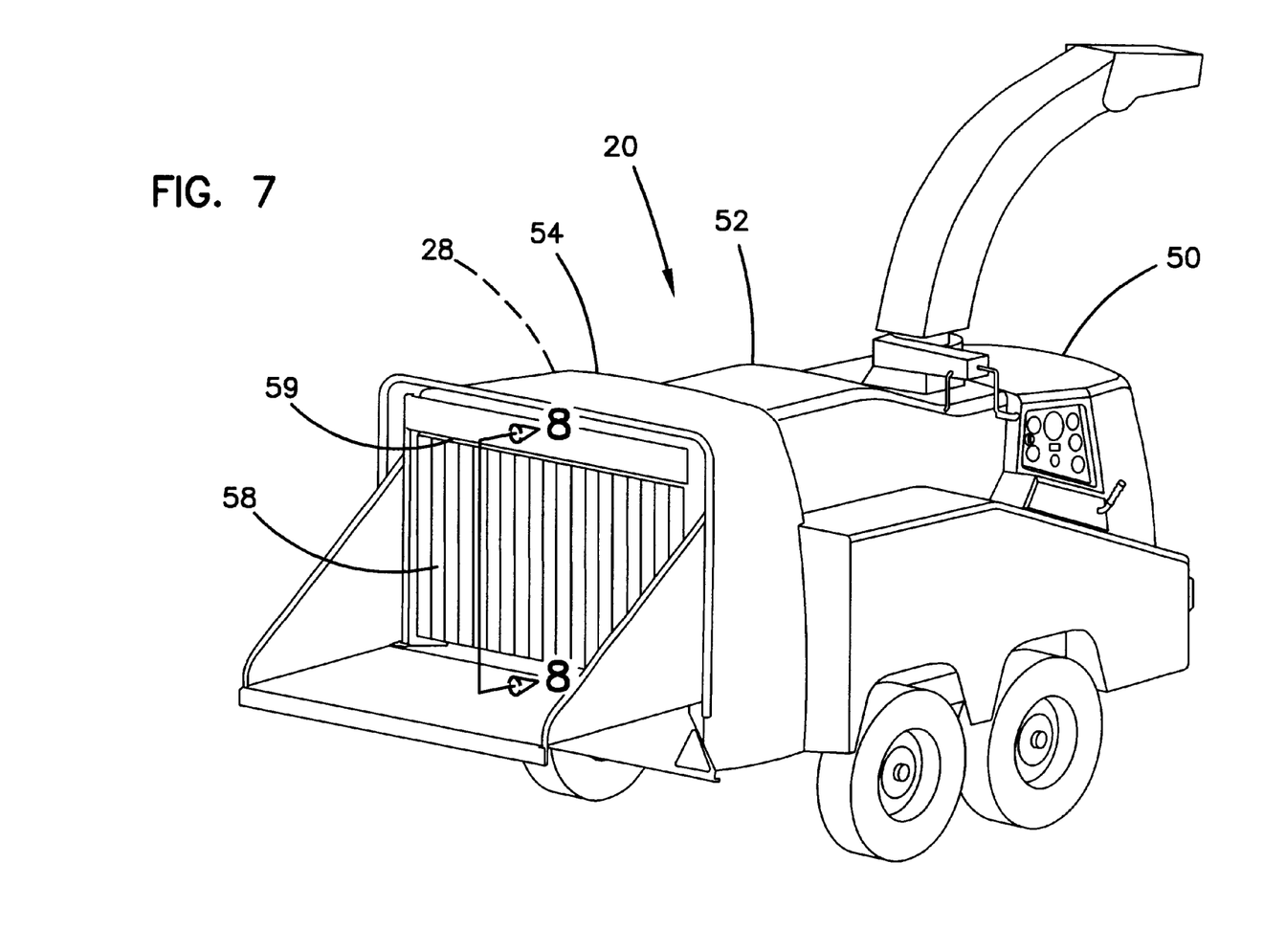
FIG. 7 illustrates a noise abatement shielding configuration suitable for use with the wood chipper of FIGS. 2 and 3.
Figure 8:
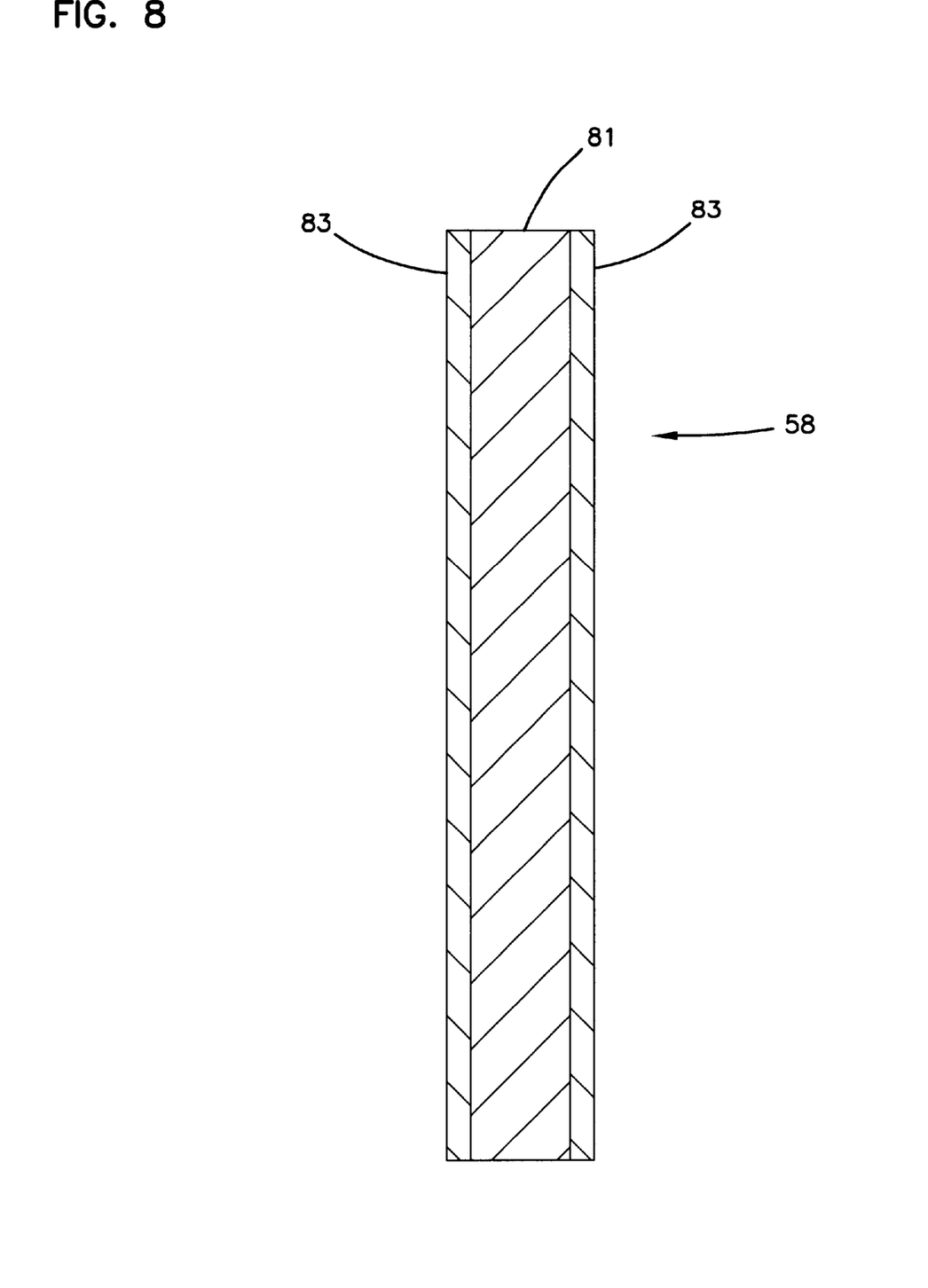
FIG. 8 is a cross-sectional view taken along cross section line 8—8 of FIG. 7.

FIG. 7 illustrates a dual axle version of the chipper 20 equipped with exterior shielding for abating noise. For example, a front shield 50 is mounted over the engine 122, an intermediate shield 52 is mounted over the housing 24, and a rear shield 54 is mounted over the feed chute 28. The shields 50, 52 and 54 preferably include a noise abating material such as plastic, fiberglass, etc. The front shield 50 is preferably spaced-apart from the engine 122 and secured to the frame 22. The intermediate shield 52 is preferably spaced-apart from (i.e., not in direct contact with) the housing 22 and connected to the fenders of the frame 22. The rear shield 54 is preferably spaced-apart from the feed chute 28 and connected to the frame 22. To further abate noise, a curtain or flap structure 58 is positioned over an inlet opening 59 of the feed chute 28. As shown in FIG. 9, the flap structure 58 preferably a noise absorbing layer 81 positioned between inner and outer wear resistant layers 83. The wear resistant layers 83 are preferably harder than the noise absorbing layer 81. The noise absorbing layer 81 preferably has superior noise absorbing or abating characteristics as compared to the wear resistant layers. In one particular embodiment, the noise absorbing layer 81 is made of foam and the wear resistant layers are made of rubber.

With the regard to the foregoing description, it is to be understood that changes may be made in detail, especially in matters of the construction materials employed and the shape, size and arrangement of the parts without departing from the scope of the present invention. For example, while three isolators have been described for dampening vibration of the housing 24 and four isolators 138 have been described for dampening vibration of the engine 123 it will be appreciated that the number of isolators can be varied. Also, in certain embodiments, both the engine 122 and the housing 24 can be mounted on a common secondary frame/platform that is isolated relative to the main frame 22. It is intended that the specification and depicted aspects be considered exemplary only, with a true scope and spirit of the invention being indicated by the broad meaning of the following claims.

What is claimed is:

1. A wood chipper comprising:
   a support frame;
   an engine mounted on the support frame;
   at least one resilient isolator for dampening vibration between the engine and the support frame;
   a drive sheave;
   a chipping mechanism mounted on the support frame;
   a belt for transferring torque between the drive sheave and the chipping mechanism, the drive sheave being moveable to tighten and loosen the belt; and
   a drive member for transferring torque between the engine and the drive sheave, the drive member including a pivotal portion that allows the drive sheave to be laterally moved relative to the engine when the belt is tightened and loosened.

2. The wood chipper of claim 1, wherein the pivotal portion of the drive member includes a pair of universal joints for allowing the drive sheave to be laterally moved relative to the engine.

3. The wood chipper of claim 1, wherein the drive sheave is laterally moved by a pivot member that is connected to the frame by a pivot mount.

4. The wood chipper of claim 1, further comprising a control arrangement for moving the drive sheave between an engaged position and a disengaged position, and also for adjusting an engine speed between a high idle condition and a low idle condition, the control arrangement including means for preventing the drive sheave from being moved from the disengaged position to the engaged position when the engine speed is in a high idle condition.

5. The wood chipper of claim 4, wherein the control arrangement is connected to the drive sheave by a control linkage.

6. The wood chipper of claim 4, wherein the control arrangement is connected to a throttle of the engine by a throttle cable.

7. The wood chipper of claim 1, further comprising a control arrangement for moving the drive sheave between an engaged position and a disengaged position, and also for adjusting an engine speed between a high idle condition and a low idle condition, the control arrangement including a control panel defining a slot and a control lever that extends through the slot, the slot including an intermediate portion and transverse end portions that project transversely outward from the intermediate portion, the drive sheave being moved from the disengaged position toward the engaged position by moving the control lever along the intermediate portion of the slot, and the engine speed being adjusted from the low idle condition to the high idle condition by moving the control lever along one of the transverse portions of the slot in a direction away from the intermediate portion of the slot.

8. The wood chipper of claim 1, wherein the chipping mechanism includes a cutter member positioned within a housing, the housing being mounted on the support frame by at least one resilient isolator for dampening vibration between the support frame and the housing.

9. The wood chipper of claim 1, wherein the chipping mechanism includes a cutter member positioned within a housing, the housing including a discharge chute for discharging wood chips from the housing, and the wood chipper further including an exhaust conduit for venting exhaust from the engine through the discharge chute.

10. A wood chipper comprising:
    a support frame;
    a housing mounted on the support frame, the housing being centered on a longitudinal center line that extends from a front to a back of the housing;

a cutter member for chipping wood within the housing;

a discharge chute for discharging wood chips from the housing; and first, second and third resilient isolators for dampening vibration between the housing and the support frame, the first resilient isolator being positioned adjacent the longitudinal center line and the second and third resilient isolators being offset from the center line such that the first, second and third resilient isolators are arranged in a tripod configuration.

11. The wood chipper of claim 10, wherein the first resilient isolator comprises a plurality of elastomeric mounting members positioned between the housing and the support frame.

12. The wood chipper of claim 10, further comprising an engine for driving the cutter member, and an engine isolator for dampening vibration between the engine and the support frame.

13. The wood chipper of claim 10, further comprising an engine for driving the cutter member and an exhaust conduit for venting exhaust from the engine through the discharge chute.

14. The wood chipper of claim 10, further comprising a shield covering the engine, the shield including sound absorbing material.

15. The wood chipper of claim 10, further comprising a shield covering the housing, the shield including sound absorbing material.

16. The wood chipper of claim 10, further comprising an infeed housing defining an inlet opening for allowing wood to be fed into the housing, the infeed housing including a noise abating curtain that at least partially covers the inlet opening.

17. The wood chipper of claim 16, wherein the curtain includes a noise absorbing layer positioned between two wear resistant layers.

18. The wood chipper of claim 10, further comprising a feed mechanism positioned within the housing for feeding wood toward the cutter member.

19. A wood chipper comprising:

a support frame;

an engine mounted on the support frame;

at least one resilient isolator for dampening vibration between the engine and the support frame;

a drive sheave;

a chipping mechanism mounted on the support frame;

a belt for transferring torque between the drive sheave and the chipping mechanism, the drive sheave being moveable to tighten and loosen the belt; and the drive sheave being connected to the frame in such a manner that side loading applied to the drive sheave by the belt is transferred to the frame; and a drive member for transferring torque between the engine and the drive sheave, the drive member being configured to prevent side loading from being transferred from the drive sheave to the engine.

* * * * *